(12) United States Patent
Bowen et al.

(10) Patent No.: US 6,324,010 B1
(45) Date of Patent: Nov. 27, 2001

(54) OPTICAL ASSEMBLY AND A METHOD FOR MANUFACTURING LENS SYSTEMS

(75) Inventors: John P. Bowen; Michael K. Budinski, both of Pittsford; Paul D. Ludington, Brockport; Paul O. Mclaughlin, Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/516,094

(22) Filed: Feb. 29, 2000

Related U.S. Application Data
(60) Provisional application No. 60/144,509, filed on Jul. 19, 1999.

(51) Int. Cl.[7] .............. G02B 27/10; G02B 9/04; G02B 7/02; B29D 11/00
(52) U.S. Cl. ............ 359/622; 359/793; 359/819; 264/1.1
(58) Field of Search ............... 359/362, 619, 359/622, 719, 793, 819; 264/1.1; 159/101; 65/38

(56) References Cited

U.S. PATENT DOCUMENTS

| | | | |
|---|---|---|---|
| 3,706,486 | 12/1972 | de Montebello | 359/619 |
| 4,512,641 | * 4/1985 | Mochizuki et al. | 359/362 |
| 4,755,017 | * 7/1988 | Kapany | 385/33 |
| 4,835,078 | 5/1989 | Harvey et al. | 430/22 |
| 5,239,412 | 8/1993 | Naka et al. | 359/619 |
| 5,260,152 | 11/1993 | Shimizu et al. | 430/5 |
| 5,276,538 | 1/1994 | Monji et al. | 349/95 |
| 5,370,768 | * 12/1994 | Merserau et al. | 216/26 |
| 5,446,815 | 8/1995 | Ota et al. | 385/33 |
| 5,540,799 | 7/1996 | Lebby et al. | 156/245 |
| 5,543,942 | 8/1996 | Mizuguchi et al. | 349/5 |
| 5,581,605 | 12/1996 | Murakami et al. | 378/84 |
| 5,638,469 | 6/1997 | Feldman et al. | 385/14 |
| 5,661,831 | 8/1997 | Sasaki et al. | 385/49 |
| 5,681,757 | 10/1997 | Hayes | 438/406 |
| 5,694,246 | 12/1997 | Aoyama et al. | 359/619 |
| 5,835,517 | 11/1998 | Jayaraman et al. | 372/50 |
| 5,850,276 | 12/1998 | Ochi et al. | 349/158 |
| 5,853,960 | * 12/1998 | Tran et al. | 430/321 |
| 5,938,989 | * 8/1999 | Hambright | 264/2.5 |
| 6,160,672 | * 12/2000 | Chan et al. | 359/819 |

OTHER PUBLICATIONS

"Micro–jet Printing of Refractive Micro–lenses" by W. Royall Cox, Ting Chen, Chi Guan, Donald J. Hayes and Rick E. Hoenigman, Brian T. Teipan and Duncan L. MacFarlane, Proceedings, OSA Diffractive Optics and Micro–Optics Topical Meeting, Kailua–Kona, Hawaii, Jun. 1998.

* cited by examiner

*Primary Examiner*—Georgia Epps
*Assistant Examiner*—David N. Spector
(74) *Attorney, Agent, or Firm*—William J. Greener

(57) ABSTRACT

According to one aspect of the present invention, a method of making a lens assembly with a plurality of lens arrays having a plurality of lenslets and at least one spacer having a plurality of holes, includes the steps of (i) arranging at least two lens arrays and the spacer, such that the spacer is located between the two lens arrays and the lenslets of one of the two lens arrays overlay the lenslets of another one of the two lens arrays and, the holes of the spaces are located between the corresponding lenslets of the two lens arrays; (ii) fixedly attaching the lens arrays and the spacer to one another to form an array assembly; and (iii) dividing the array assembly to create a plurality of individual lens systems. According to another aspect of the present invention, the optical assembly includes at least two lens arrays and at least one spacer with a plurality of holes. The spacer is located between the two lens arrays and is fixedly attached to the two lens arrays. The spacer has a thickness of 0.05 to 0.5 mm. The lens arrays have a plurality of lenslets of no more than 1 mm in diameter. It is preferred that the lens arrays have a largest dimension of at least 5 mm.

38 Claims, 15 Drawing Sheets

1 μm

100 μm

200 μm

OPTICAL ASSEMBLY AND A METHOD FOR MANUFACTURING LENS SYSTEMS

CROSS REFERENCE TO RELATED APPLICATION

Reference is made to and priority claimed from U.S. Provisional Application Ser. No. 60/144,509, filed Jul. 19, 1999, entitled AN OPTICAL ASSEMBLY AND A METHOD FOR MANUFACTURING LENS SYSTEMS.

FIELD OF THE INVENTION

This invention relates to optical assemblies and methods for creating optical assemblies and lens systems that utilize lens arrays, and in particular, the methods for attaching and holding two or more lens arrays in precise position with respect to one another.

BACKGROUND OF THE INVENTION

Common industry practice for assembly of lens systems relies upon assembly of individual discrete lens elements with respect to one another for each individual lens system. This technique is useful for lens systems comprising a large lens elements, but is very difficult to use when lens elements are very small (less than 1 mm in diameter). Manufacturing many lens elements on a common carrier called a lens array streamlines the manufacture of the lens elements.

It is known to attach arrays of optical elements to electronic modules. Such assemblies have been described in U.S. Pat. No. 5,638,469, entitled "Microelectronic module having optical and electrical interconnects", and U.S. Pat. No. 5,661,831, entitled "Optical module having self-aligned optical element and optical wave-guide by means of bumps on rectangular pads and method of assembling thereof". However, the methods described in these patents are not optimal for creating single (i.e., individual) lens systems at a later time. Furthermore, many of the methods used to attach lens elements to electronic modules rely upon solder balls for alignment. Use of solder balls requires extra steps of patterning, solder deposition, and solder re-flow.

SUMMARY OF THE INVENTION

The object of the present invention is to enable accurate assembly of very small lens elements into lens systems, while these lens elements form parts of lens arrays.

According to one aspect of the present invention, a method of making a lens assembly with a plurality of lens arrays having a plurality of lenslets and at least one spacer having a plurality of holes, includes the steps of (i) arranging at least two lens arrays and the spacer, such that the spacer is located between the two lens arrays and the lenslets of one of the two lens arrays overlay the lenslets of another one of the two lens arrays and, the holes of the spaces are located between the corresponding lenslets of the two lens arrays; (ii) fixedly attaching the lens arrays and the spacer to one another to form an array assembly; and (iii) dividing the array assembly to create a plurality of individual lens systems.

According to another aspect of the present invention, the optical assembly includes at least two lens arrays and at least one spacer with a plurality of holes. The spacer is located between the two lens arrays and is fixedly attached to the two lens arrays. The spacer has a thickness of 0.05 to 0.5 mm. The lens arrays have a plurality of lenslets of no more than 1 mm in diameter. It is preferred that the lens arrays have a largest dimension of at least 5 mm.

It is an advantage of the present invention that in manufacturing lens assemblies using one, or more than one lens array, the size of the parts are increased in order to make them more manufacturable and more easily assembled.

BRIEF DESCRIPTION OF THE DRAWINGS

The prior art and the invention will be described in relation to the drawings, wherein.

DETAILED DESCRIPTION OF THE INVENTION

Figure 1A:
FIG. 1A is a side view of a lens array.
Figure 1B:
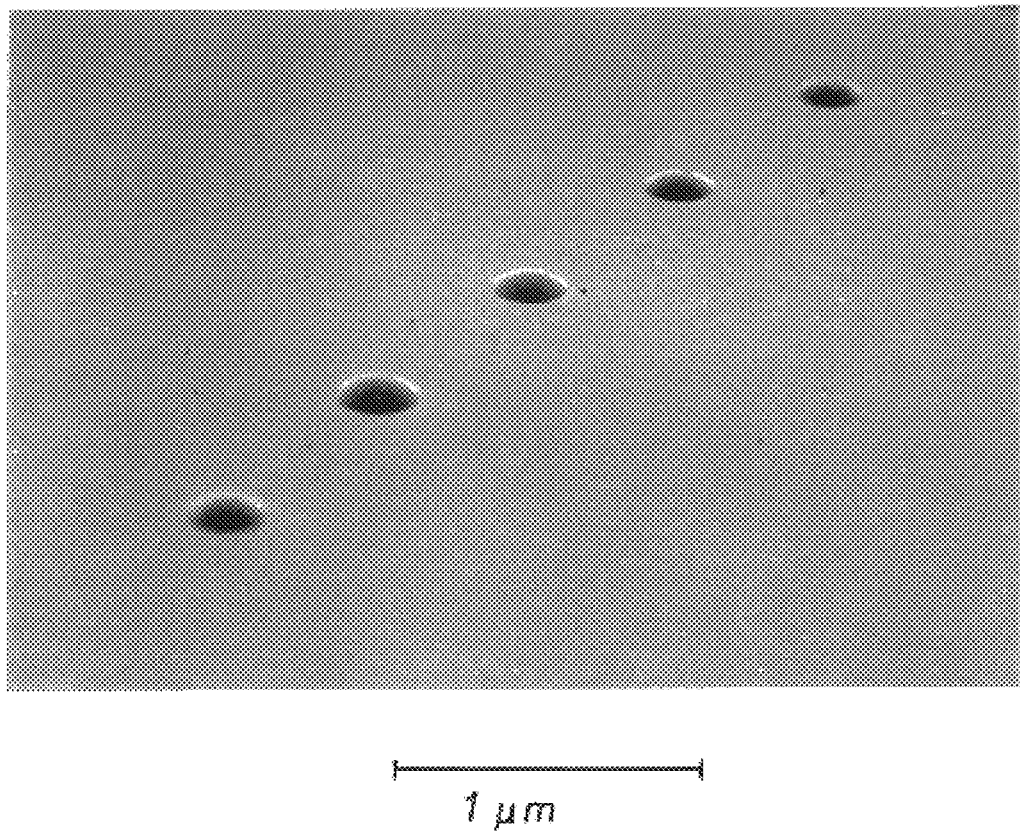
FIG. 1B is a perspective view of five lenslets on a lens array of FIG. 1A.
Figure 1C:
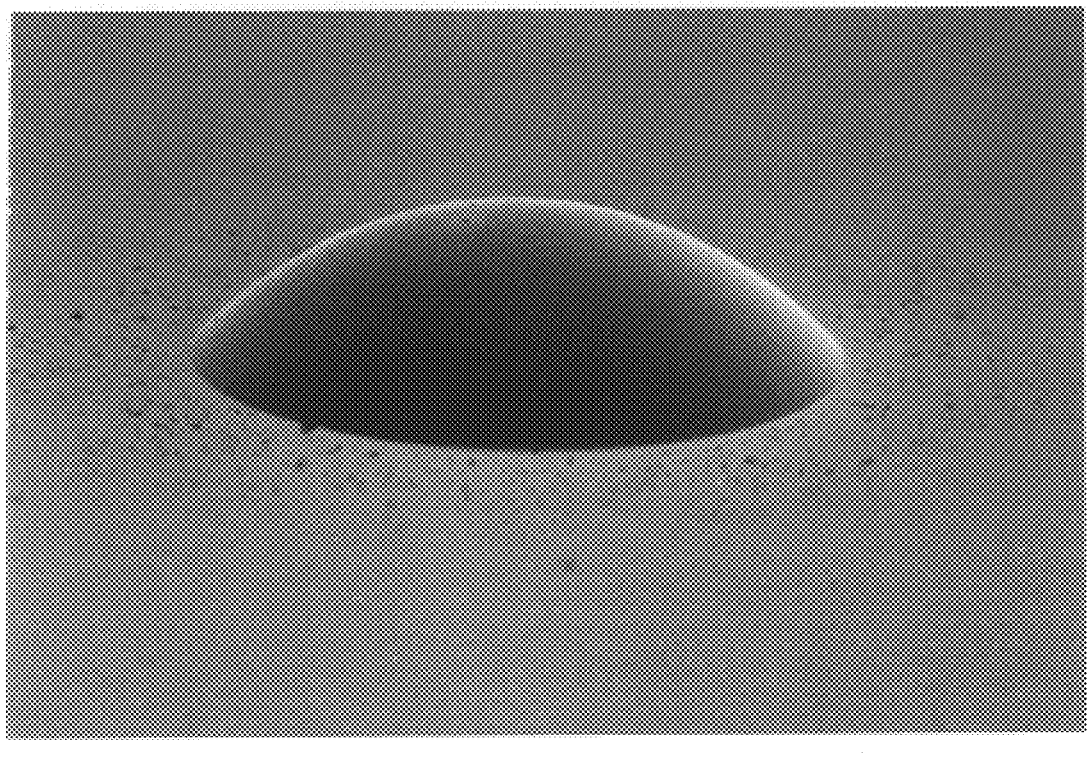
FIG. 1C is an expanded perspective view of one of the lenslets of FIG. 1B.

FIG. 1A shows a side view of a lens array 10. The array 10 is a flat disk of glass containing many elements 12 made out of glass. In this embodiment the lens elements 12 are 270 µm in diameter and extend by 62 µm beyond the top surface of the lens array 10. The lens array may be glass or plastic. FIG. 1B and FIG. 1C are a copy of an actual photograph which shows a perspective view of the lens elements 12.

Figure 2:
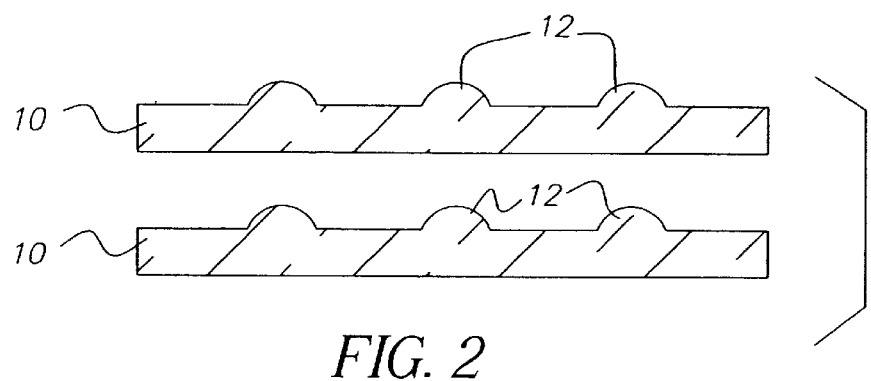
FIG. 2 is a view of two lens arrays.

FIG. 2 shows two lens arrays 10 next to each other. It is one aspect of the present invention that two lens arrays may be made by the same mold, so that the two lens arrays (top and bottom) are identical. Forming the array assembly with two identical lens arrays results in excellent alignment between all lens elements on the top and bottom arrays. Furthermore, the lens elements 12 of the top lens array 10 can be aligned with respect to the lens elements 12 of the bottom lens array 10 virtually simultaneously.

Figure 3:
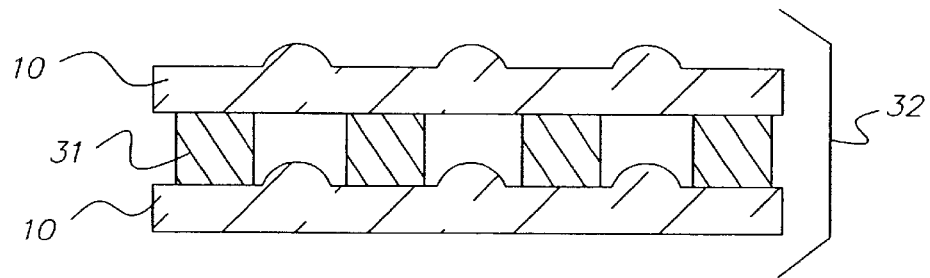
FIG. 3 shows the two lens arrays of FIG. 2 attached to one another.

The lens elements 12 on the top lens array 10 and the lens elements 12 on the bottom lens array 10, in combination with a spacer 31 form an assembled arrays 32 of duplets 41. A lens element is formed from a single piece of refractive material and has two surfaces, at least one of which provides optical power. Duplets are two lens elements separated by an airspace. See FIG. 3. In this embodiment, the spacer 31 is 0.09 mm thick.

Figure 4A:
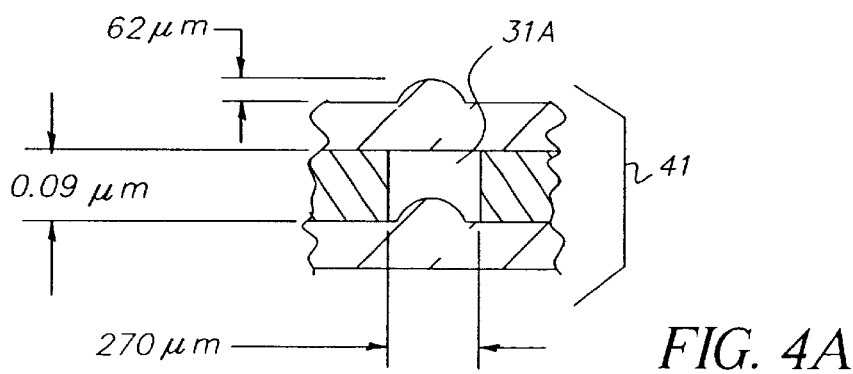
FIG. 4A is a cross-section of a duplet after singulation.
Figure 4B:
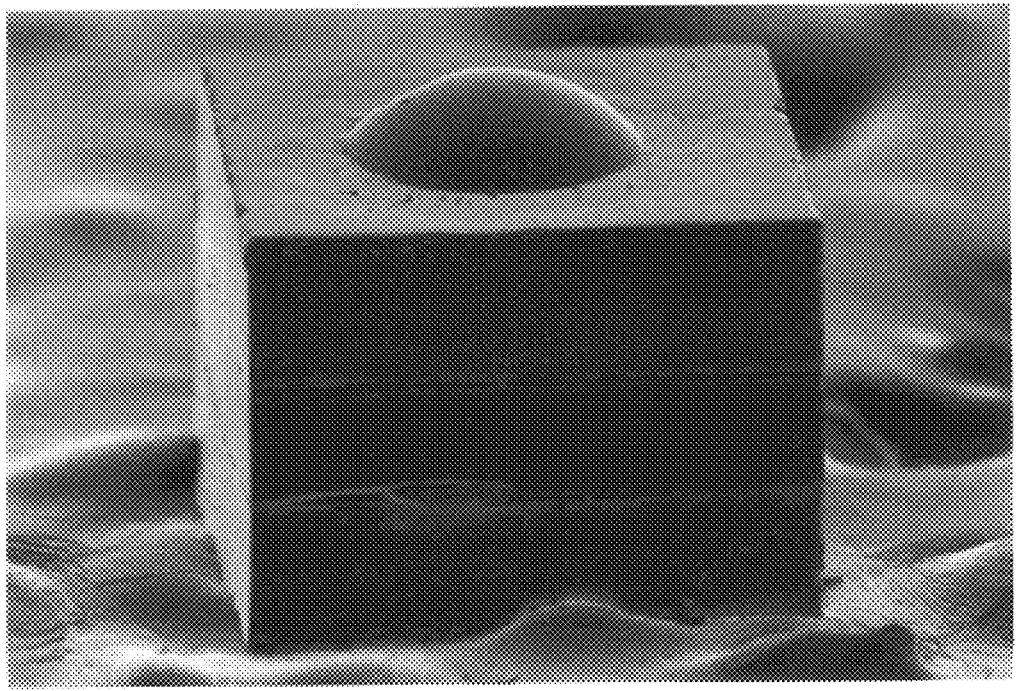
FIG. 4B is a perspective view of a duplet of FIG. 4A.

FIGS. 4A and 4B show a duplet 41 that has been singulated (i.e., cut out of the assembled array of duplets 32). As described above, each lens element 12 of the top lens array 10 is aligned with corresponding lens element 12 of the bottom lens elements 10. Therefore, the lens elements 12 of each duplet 41 are aligned with respect to one another. This is much easier and less expensive than the prior art assembly of individual lens systems where each lens element is individually aligned to other lens elements.

FIGS. 5A, 5B, 6A–6E and 7A–7C illustrate various methods that could be used to fabricate spacers 31. A spacer is a mechanical part, that separates the two lens arrays. One possible material choice for the spacer 31 is silicon. Silicon has the advantage in that it can be easily polished to a flat surface, and it can be etched by processes known in the semiconductor industry. Of course, other materials such as ceramic could be used for the spacer 31. It is preferred to pattern the spacer material in order to provide through holes 31A in order for the light to pass through the duplet. It is noted that a spacer consisting of a liquid that is later polymerized or hardened could also be used, however, this type of spacer may affect the optical power of the lens systems and this affect must be taken into consideration during design of the lens system.

Figure 5A:
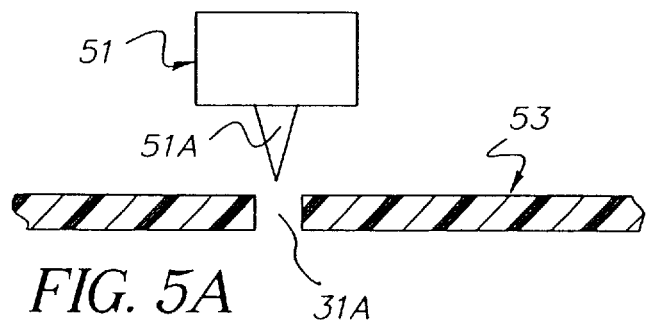
FIG. 5A illustrates a laser that is being used to manufacture a spacer separating the two lens arrays.
Figure 5B:
FIG. 5B is a cross-section of the manufactured spacer.

FIG. 5A shows an excimer laser 51 being used to provide a focused laser beam 51A to form the holes 31A in the silicon water 53. The excimer laser 51 has the advantage that it can cut through silicon relatively quickly. Vendors are known to provide services to machine silicon wafers in this manner. One such vendor is Resonetics Inc., of 5 Bud Way #21, Nashua, N.H., USA. Of course, other methods could be used to pattern the wafer. FIG. 5B shows the completed spacer 31. Spacer 31 may also be made of glass, metal, ceramic, polymer or combinations thereof.

Figure 6A:
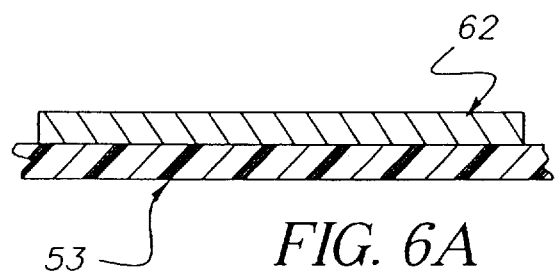
FIGS. 6A–6E illustrate lithographic steps used to produce through holes in the spacer.
Figure 6B:
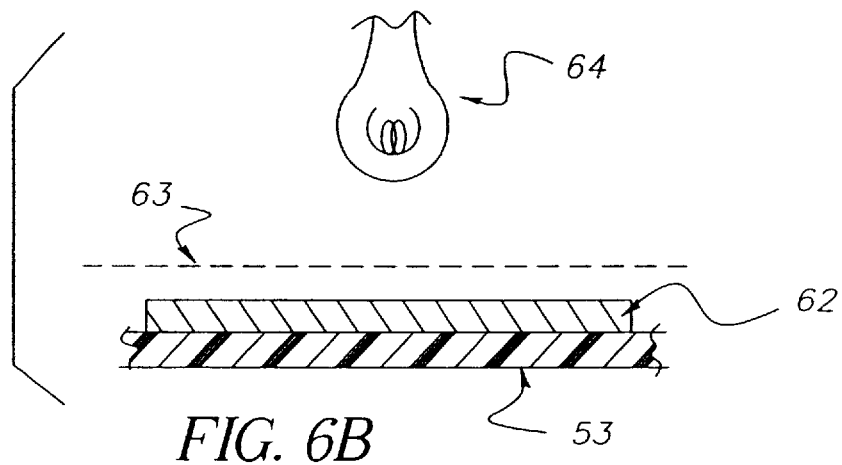
Figure 6C:
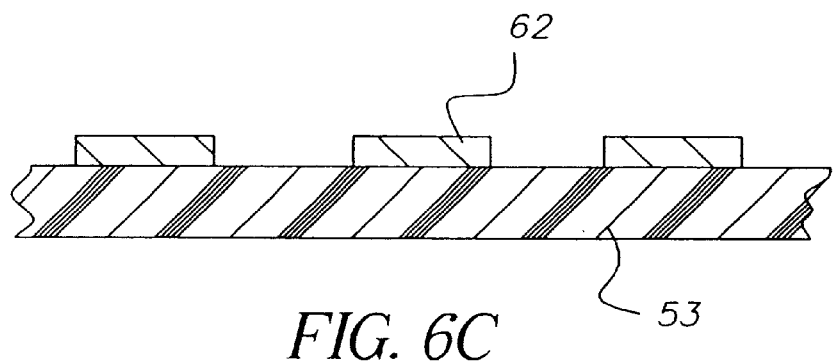
Figure 6D:
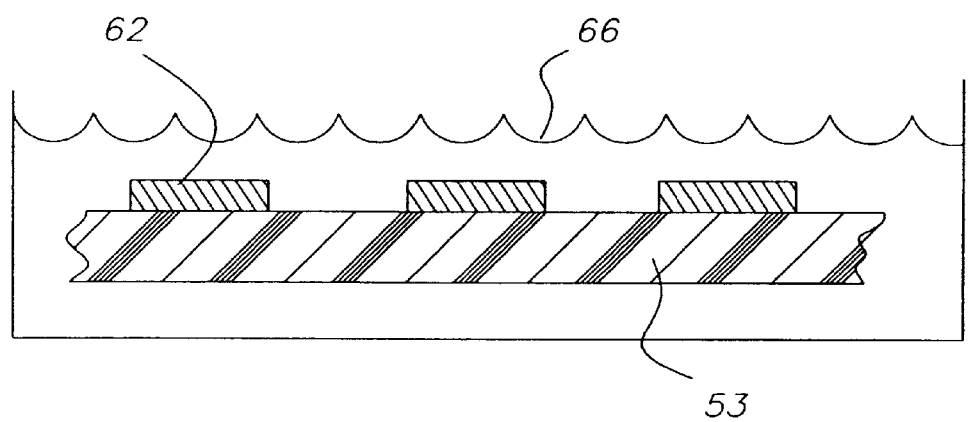
Figure 6E:
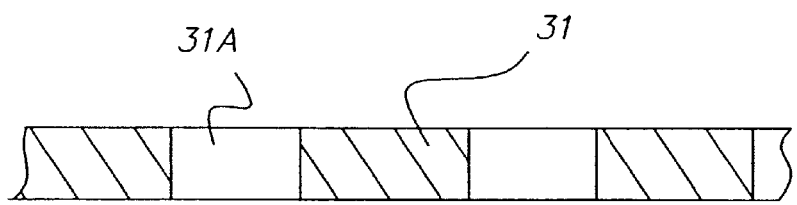

FIGS. 6A–6E illustrate a photo-lithographic method for producing patterned wafers. Such methods are commonly used in the semiconductor industry. One commercial vendor for such wafers is Advanced Micromachines of Cleveland, Ohio, USA. In FIG. 6A, the solid wafer 53 is coated with a photo-resist material 62. In FIG. 6B, a mask 63 and an exposure lamp 64 are used to expose the image of the mask 63 on the photo-resist material 62. FIG. 6C illustrates the result of the exposure. In FIG. 6D, the exposed wafer 53 and photo-resist material 62 are placed in a bath 66 that dissolves away the unprotected spacer material to form the finished spacer 31 (shown in FIG. 6E).

Figure 7A:
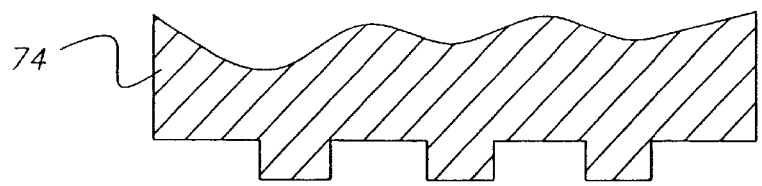
FIGS. 7A–7C illustrates fabrication of the spacer with electric discharge machining.
Figure 7B:
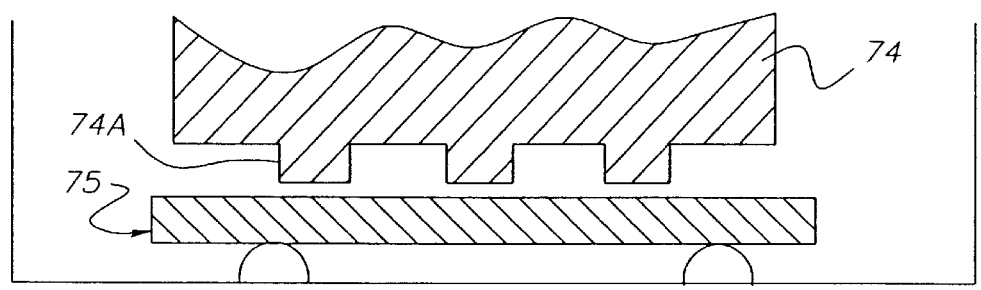
Figure 7C:
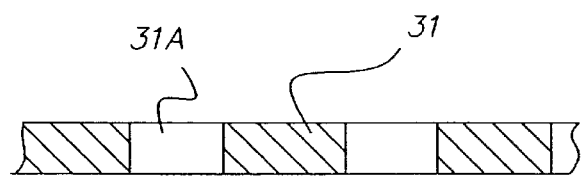

FIG. 7A–7C illustrate another process for manufacturing the spacer 31. FIG. 7A shows a carbon electrical discharge machining tool 74 which contains the positive image features 74A of the holes 31A required for the spacer 31. FIG. 7B illustrates the carbon machine tool 74 (also called the carbon electrode) and a spacer material 75 are in close proximity to one another. An electric current is passed between the spacer material 75 and the electrical discharge machining tool 74 forming an ark between features 74 and the spacer material 75. This creates a plurality of holes in spacer material 75. The result is shown in FIG. 7C. More specifically, FIG. 7C shows the resulting pattern of the manufactured spacer 31 with resulting holes 31A. It is noted that instead of an electrical discharge machining tool, a similarly charged tool made of metal can be used to ultrasonically (through vibration) machine holes 31A in the spacer 31.

If the lens system (for example, duplet 41) is to be used in an environment where the temperature is changing, it may be advantageous to have the spacer 31 which is made of the same or similar material as that of the lenslets 12. If the spacer 31 is made of the same or similar material; (i.e., material with same or similar thermal expansion) stresses that would arise from a difference in thermal expansion coefficients for the spacer and the lens will be minimized. It is preferred that $0.8T_2<T_1<1.2T_2$, where $T_2$ is coefficient of thermal expansion for the material forming lenslets 12 and $T_1$ is the coefficient of thermal expansion of the spacer material. It is more preferable that $0.95T_2<T_1<1.05T_2$. It is even more preferable that $0.98T_2<T_1<1.08T_2$. It is most preferable that $T_2=T_1$. Therefore, making a glass spacer 31 of the same glass as glass arrays would eliminate the differences in the thermal coefficients $T_1$ and $T_2$.

Figure 8:
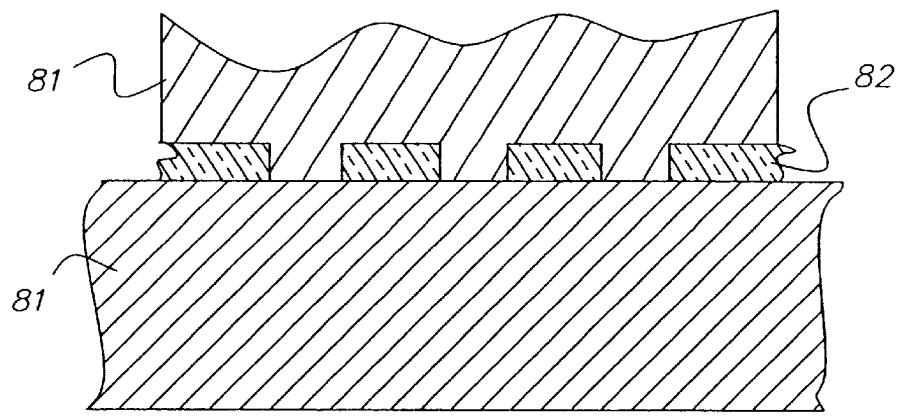
FIG. 8 illustrates fabrication of the glass spacer by molding.

FIG. 8 illustrates two processes by which a glass spacer could be produced. FIG. 8a shows a spacer 82 molded of glass through the use of glass ing tool 81.

Several methods can be used to attach the spacer to the lens arrays. FIGS. 9A–9C, 10, 11A–11B and 12A–12B illustrate various methods of attaching the spacer 31 to the lens array 10.

Figure 9A:
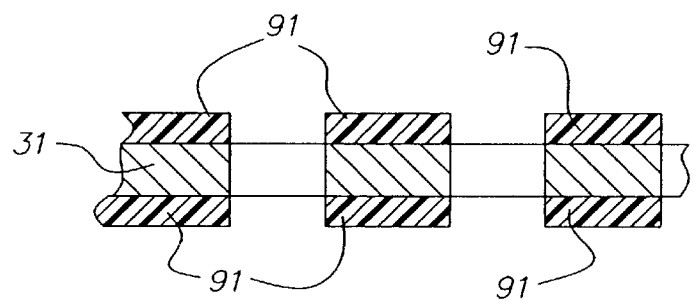
FIG. 9A illustrates a spacer that is coated with epoxy on both sides.
Figure 9B:
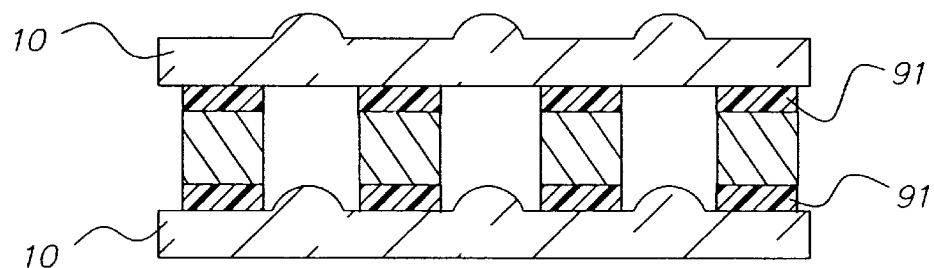
FIG. 9B illustrates that two lens arrays attached to the spaces of FIG. 9A.
Figure 9C:
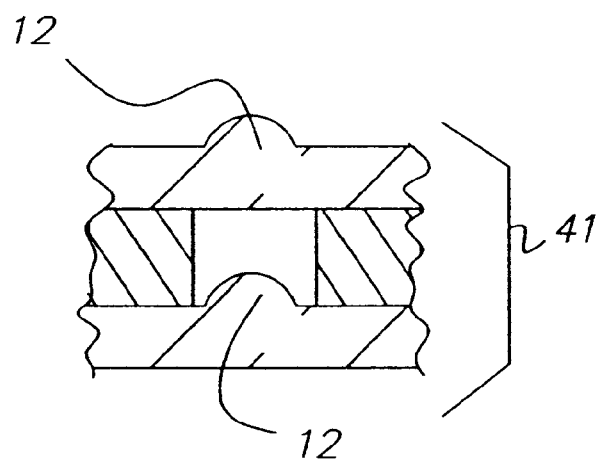
FIG. 9C illustrates a singulated duplet that has been cut from the lens array assembly of FIG. 9B.
Figure 9D:
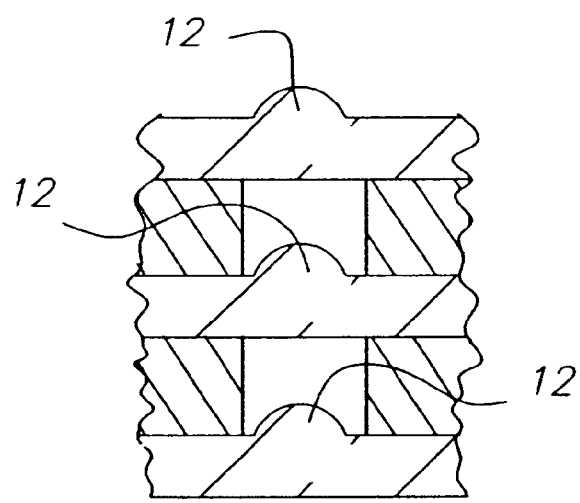
FIG. 9D is a cross-section of a triplet.

FIG. 9A shows the spacer 31 coated on both sides with epoxy 91. FIG. 9B shows two lens arrays 10 positioned with respect to the spacer 31. The epoxy 91 is cured by heat or ultra-violet radiation (depending on the type of epoxy chosen), resulting in a bonded lens assembly. FIG. 9C shows the singulated duplet, 41 after it has been cut out from the bonded arrays assembly. It is noted that other lens systems, such as triplets, for example, may be made in this manner. FIG. 9D shows such a triplet lens system.

Figure 10A:
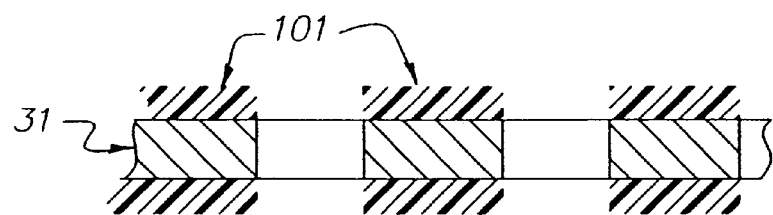
FIG. 10A illustrates a spacer with a SiO2 film.
Figure 10B:
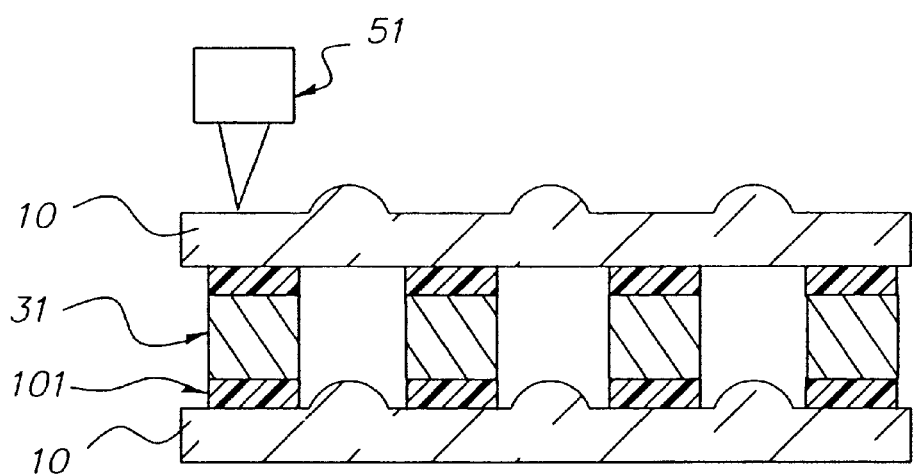
FIG. 10B illustrates the use of laser providing a laser beam that is being used to bond the spacer of FIG. 10A to the lens array by melting the SiO2 film.

FIG. 10a shows a thin layer of SiO2 (silicon dioxide) 101 placed upon the silicon spacer 31. The silicon dioxide layer 101 can be generated by a coating process (for example, electron beam evaporation) or by a growth process, such as by physical or chemical vapor deposition. In FIG. 10b the lens arrays 10 are positioned with respect to the spacer 31. A laser 51, preferably focused at the boundary of the lens elements 12 and the SiO2 layer, will cause the array 10 and the spacer 31 two layers to bond together. Another type of glass or glass/SiO2 composition may also be used for bonding.

Figure 11A:
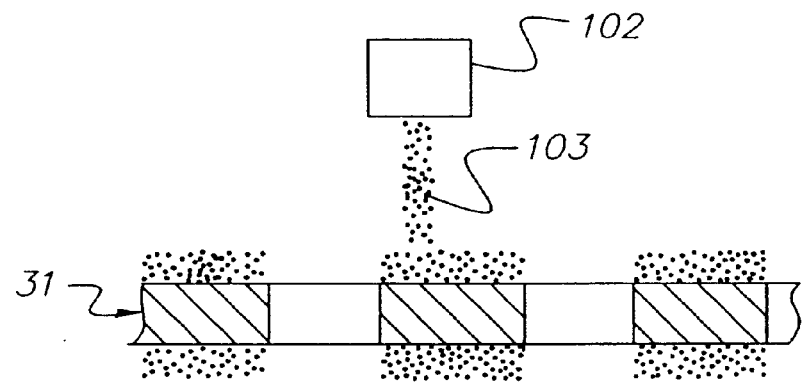
FIG. 11A illustrates a spacer with adhesive deposited by a jet spray device.
Figure 11B:
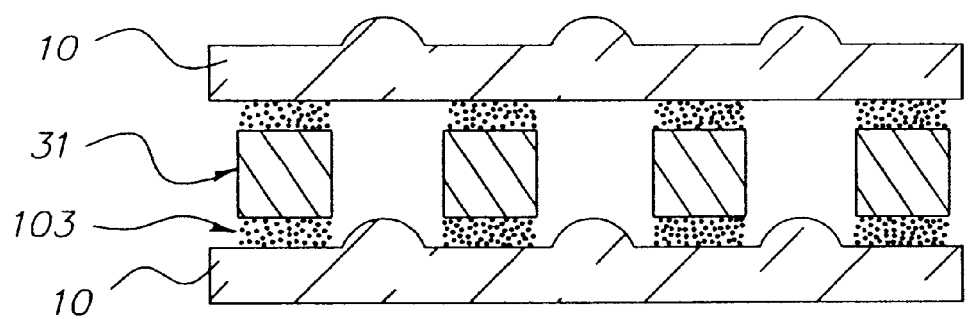
FIG. 11B illustrates an array assembly with two lens arrays bonded to the spacer of FIG. 11A.

FIGS. 11A and 11B illustrates another possible method for manufacturing lens systems. FIG. 11A shows an adhesive applied to the spacer 31 with a jet spray device 102. In this process, the perforated spacer 31 is "painted" using the jet spray device 102, which will only deposit adhesive material on the spacer 31 and not in the perforation. The advantage of a jet spray device 102 is that one can precisely control the location of the adhesive. This technology is described in an article entitled "Micro-jet Printing of Refractive Micro-lenses" by W. Royall Cox, Ting Chen, Chi Guan, Donald J. Hayes and Rick E. Hoenigman, Brian T. Teipen and Duncan L. MacFarlane, Proceedings, OSA Diffractive Optics and Micro-Optics Topical Meeting, Kailua-Kona, Hi., June 1998, and in U.S. Pat. No. 5,681,757. FIG. 11B illustrates two lens arrays 10 and the spacer 31, that are held in alignment while the adhesive 103 is cured by heat or UV radiation.

Figure 12A:
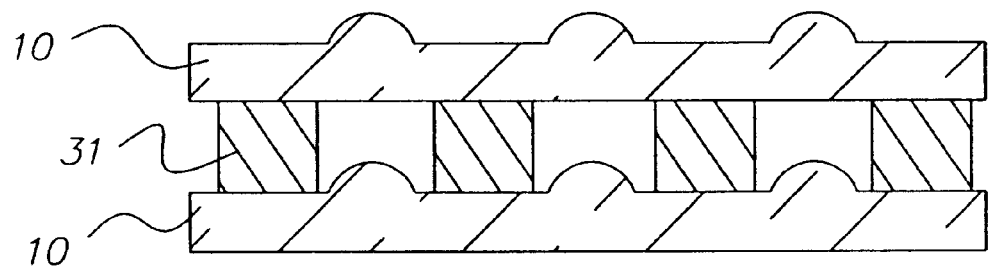
FIG. 12A illustrates a glass spacer with two lens arrays.
Figure 12B:
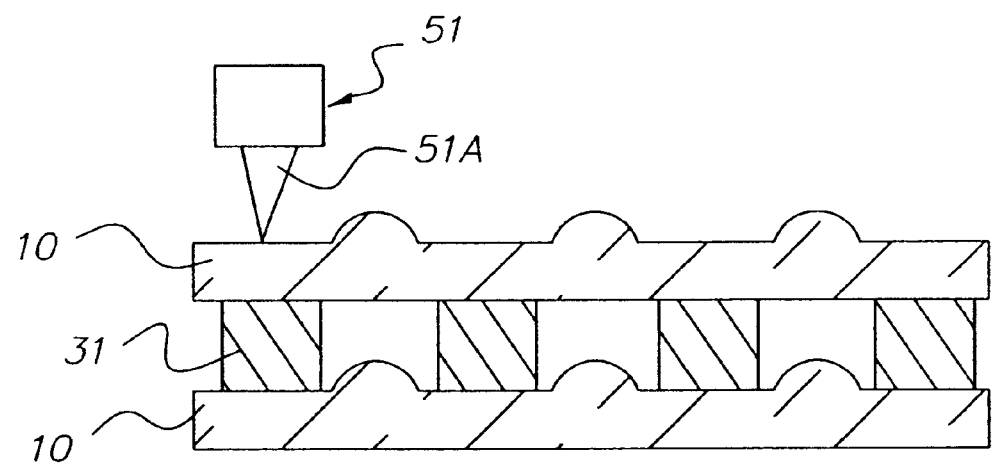
FIG. 12B illustrates a laser that is used to heat the interface between the spacer of FIG. 12A and the lens arrays in order to form a bond between the lens arrays and the spacer.

FIG. 12A illustrates a molded glass spacer 31. The glass spacer 31 is made of the same material as the lens arrays 10. FIG. 12B shows the glass spacer 31 which is aligned to the two lens arrays 10. FIG. 12B also illustrates the lens array assembly being bonded by laser welding via the use of a laser 51. This bonding may also be accomplished by thermal attachment.

Although it is not shown, it is also possible to bond a silicon spacer, to a glass lens array containing sodium or similar materials, by anodic bonding. This method has the advantage of achieving a strong bond with no intervening material. This technique is commonly known in the semiconductor industry for packaging sensors.

Figure 13:
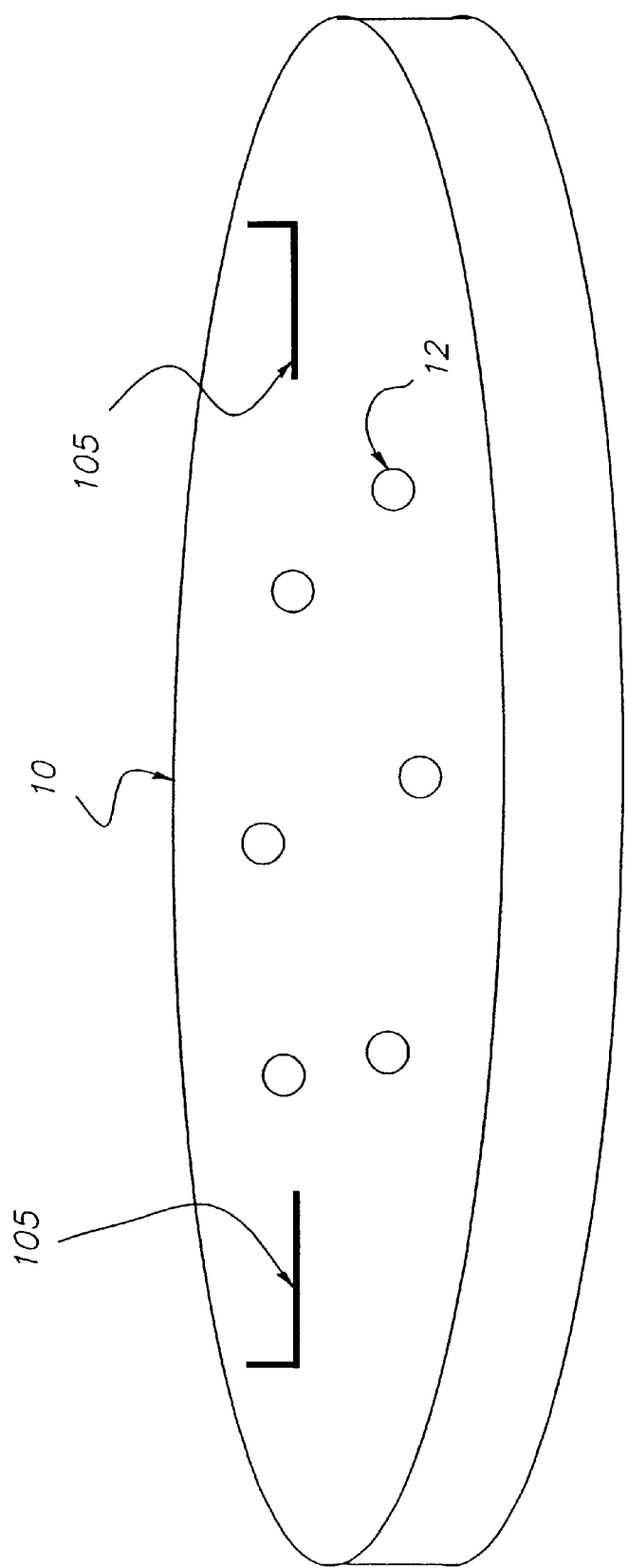
FIG. 13 shows a lens array in orthographic projection showing an arrangement of fiducials and lens elements.

Alignment of the spacer and the two lens arrays is required during assembly. Such alignment could be achieved in several ways. One approach is to use optical methods, for example, optical methods that as are commonly used to align masks for semiconductor lithography. This approach would involve the use of a fiducial 105 (shown in FIG. 13) that is manufactured as a part of the lens array 10. In FIG. 13, the lens elements 12 are shown in a radial display. The fiducial 105 could also be one of the surfaces of a lens element 12.

Figure 14:
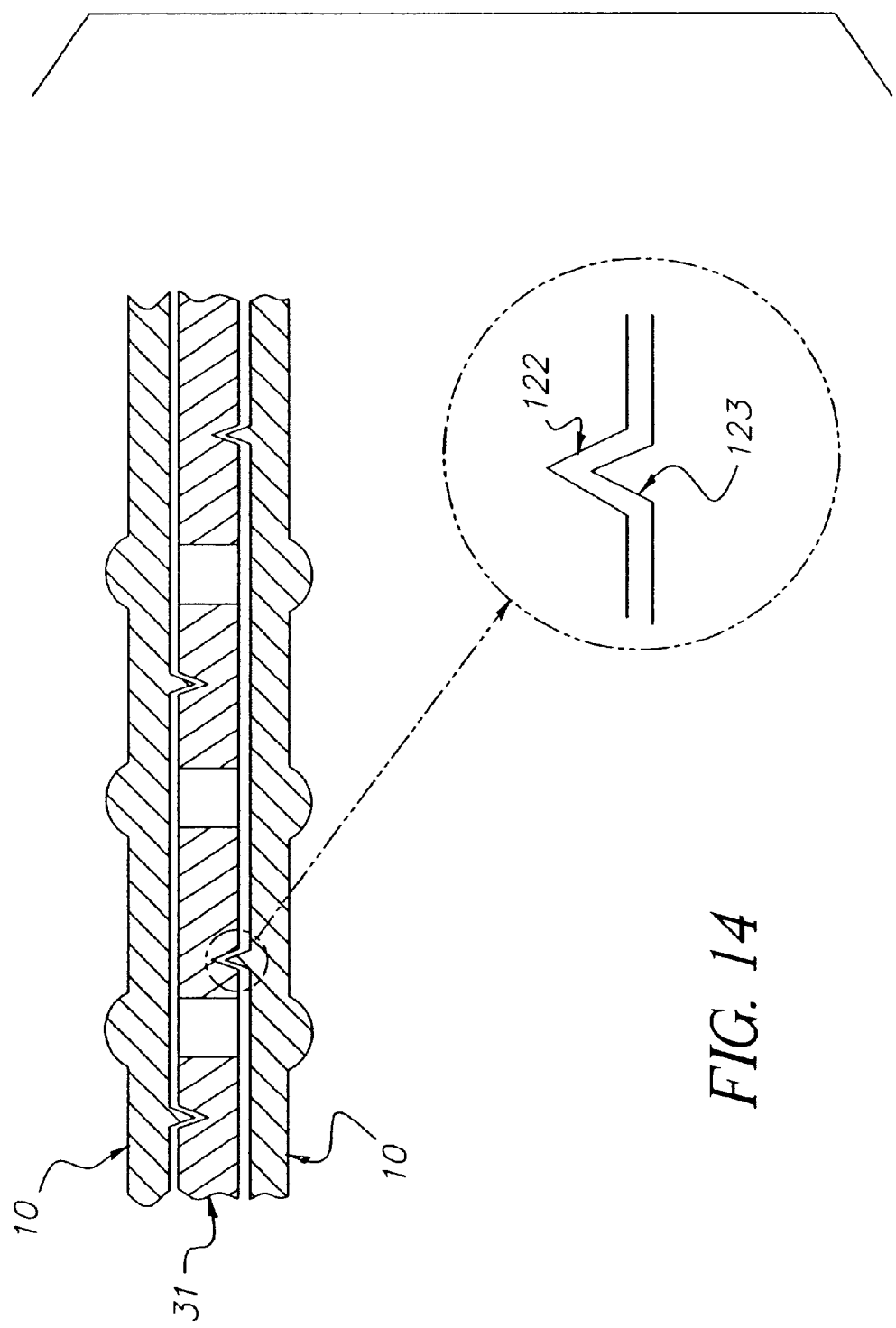
FIG. 14 shows a spacer with alignment features, and lens arrays with complimentary mating features that are used for mechanical alignment of the spacer to the lens arrays.
Figure 15:
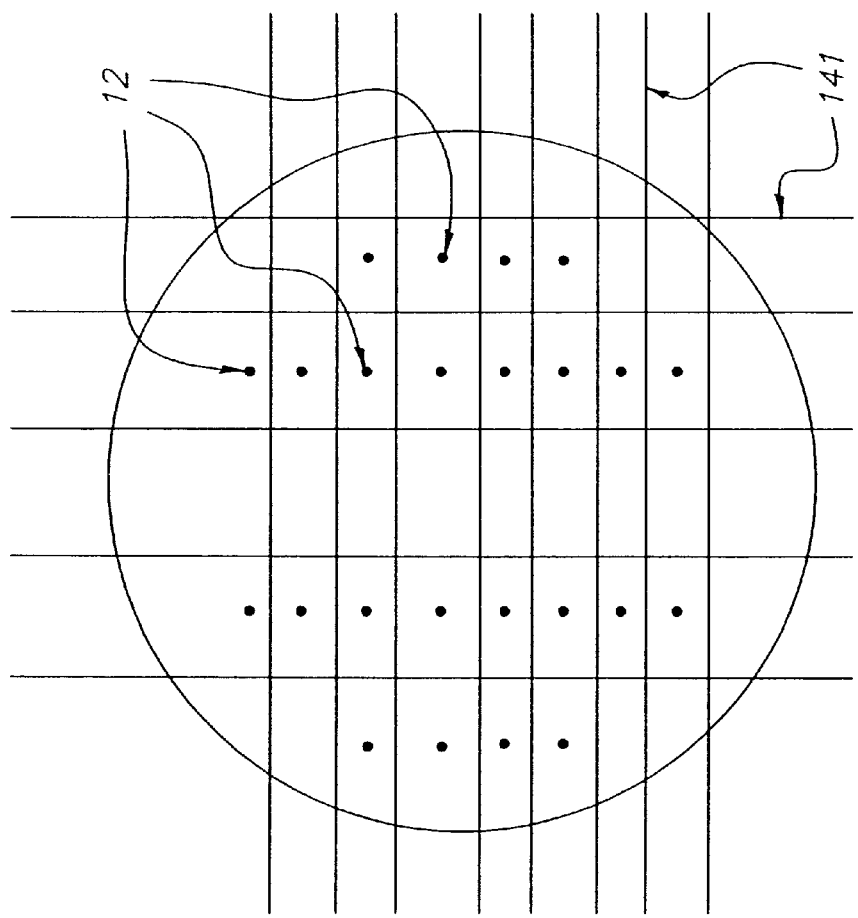
FIG. 15 shows a "top" view of the bonded array assembly, including the lens elements, and the singulation kerfs.

Another alignment method is shown in FIG. 14. The spacer 31 has a feature 122 machined in its top and bottom surface. The lens array 10 has a complimentary feature 123 molded therein. The feature 123 is designed to mate with the feature 122 on the silicon spacer 31. Such features comprise what is commonly referred to as a kinematic mount. The features 122 and 123 allow the repeatable positioning of the spacer 31 and the lens arrays 10 without alignment equipment, thereby saving assembly time and cost. An example of a useful alignment feature 122 would be a V-groove. A complimentary protrusion 123 is manufactured in the lens array 10. Other interlocking or nesting features may also be used. The final step in the manufacturing process is separating the duplet 41, shown in FIG. 4 from the assembly FIG. 3. FIG. 15 shows how the circular lens assembly is cut to remove individual the duplet from each other. In FIG. 15, the numeral 141 refers to the kerf left by the cutting device. The term "kerf" is defined as the area of missing material from sawing, burning or other operations. Singulation of individual lens systems from one another can be accomplished for example by utilizing dicing saws, excimer lasers, coring saws, or score and break mounts. These commercially available processes are used uniquely to singulate the manufactured lens systems.

It is preferred that the spacer thickness be 0.05 to 0.5 mm and that the spacer and lens arrays be 5 mm to 30 mm long or 5 mm to 30 mm in diameter.

The invention has been described in detail with particular reference to certain preferred embodiments thereof, but it will be understood that variations and modifications can be effected within the spirit and scope of the invention.

Parts List 10 lens array
12 lens elements
15 silicon material
16 photo-resist material
17 shadow mask
18 light
19 bath
31 spacer
31A Holes in Spacer 31
41 duplet
51 Laser
51A Focused Laser beam
53 Wafer
62 Photo-resist material
63 Mask
64 Exposure lamp
66 Bath
74 electrical discharge machining tool
75 spacer material
81 glass molding tool
82 molded glass spacer
91 epoxy
101 silicon dioxide layer
102 jet spray device
103 jet spray device
105 Fiducial
122 Adehesive
123 lens array alignment feature
124 fiducial
125 element
141 assembly

What is claimed is:

1. A method making a lens assembly using a plurality of lens arrays having a plurality of lenslets and at least one spacer having a plurality of holes, said method comprising the steps of:
   (i) arranging at least two lens arrays and said spacer such that said spacer is located between said two lens arrays such that said lenslets of one of said two lens arrays overlays said lenslets of another one of said two lens arrays and such that said holes are located between said lenslets;
   (ii) fixedly attaching said lens arrays and said spacer to one another to form an array assembly; and
   (iii) singulating said assembly to create a plurality of individual lens systems.

2. A method according to claim 1, wherein said elements are arranged in a rectangular grid pattern.

3. A method according to claim 1, wherein an alignment between said lens arrays and at least one spacer is accomplished through the use of kinematic features or fiducials.

4. A method according to claim 1, wherein at least two spacers and three lens arrays are bound into a single assembly prior to singulation.

5. A method according to claim 1, wherein said singulation steps divides the assembled structure and creates at least one duplet.

6. A method according to claim 1, wherein the spacer is made of silicon.

7. A method according to claim 1, wherein said spacer is made of a ceramic material.

8. A method according to claim 1, wherein said spacer is plastic.

9. A method according to claim 1, wherein the spacer is made of a glass with a coefficient of thermal expansion $T_1$ similar to the coefficient of thermal expansion $T_2$ for said lens arrays.

10. A method according to claim 1, wherein said coefficient of expansion of said spacer is $0.8T_2 \leq T_1 \leq 1.2T_2$.

11. A method according to claim 9, wherein $0.9T_2 \leq T_1 \leq 1.1T_2$.

12. A method according to claim 11, wherein $0.95T_2 \leq T_1 \leq 1.05T_2$.

13. A method according to claim 1, wherein the spacer is fabricated by one of the following method: laser machining, photolithography etching, electrical discharge machining, or ultrasonic machining.

14. A method according to claim 3, wherein adhesive is used to attach at least one of said lens arrays to said spacer.

15. A method according to claim 3, wherein an oxide film is melted in order to attach said lens array to said spacer.

16. A method according to claim 3, wherein the attachment method includes the use of adhesive deposited by jet spray.

17. A method according to claim 3, wherein the attachment method includes one of the following: thermal bonding, laser welding, or sonic bonding.

18. A method according to claim 1, wherein the singulation step includes cutting with a laser.

19. A method according to claim 1, wherein the singulation step includes sawing.

20. A method according to claim 1, wherein the singulation step includes scribing and breaking said assembly.

21. A method according to claim 1, wherein said singulation step utilizes a coring saw.

22. An optical assembly comprising:
a first lenslet;
a second lenslet; and
a spacer positioned between the first lenslet and the second lenslet,
wherein the first lenslet, the second lenslet, and the spacer are divided from at least two lens arrays with a plurality of lenslets and at least one spacer, said spacer being located between said two lens arrays and being fixedly attached to said two lens arrays, said spacer having a thickness of 0.02 mm to 0.5 mm; each of said plurality of lenslets being no more than 1 mm in diameter.

23. An optical assembly according to claim 22, wherein said lens arrays have a largest dimension of at least 5 mm.

24. An optical assembly according to claim 22, wherein said spacer has multiple features aligning said spacer with respect to said lens arrays.

25. An optical assembly according to claim 24, wherein said lens arrays have complimentary features engaging said multiple features of said spacer at least during alignment.

26. An optical assembly according to claim 25, wherein said alignment is a kinematic alignment.

27. A lens array containing a plurality of lens elements, said array further including alignment fiducials.

28. A lens array according to claim 26, wherein said lens elements are no larger than 1 mm in diameter.

29. An assembly comprising:
a lens array with a plurality of lenslets and a spacer with a plurality of through holes, said lens array and said spacer having complimentary structures capable of engaging each other and kinematically aligning said lens arrays to said spacer, such that said plurality of lenslets are aligned with said plurality of through holes.

30. A method according to claim 1, wherein at least some of said lenslets have positive optical power.

31. A method according to claim 1 wherein at least some of said lenslets have negative optical power.

32. A method of making a lens assembly using a plurality of lens arrays having a plurality of lenslets and at least one spacer having a plurality of holes, said method comprising the steps of:
providing at least two lens arrays, each of the at least two lens arrays having a plurality of lenslets;
providing at least one spacer;
positioning the at least one spacer between the at least two lens arrays such that the lenslets of one of the at least two lens arrays overlays the lenslets of another one of the at least two lens arrays, the holes of the at least one spacer being located between the lenslets of the at least two lens arrays;
attaching the at least two lens arrays to the at least one spacer forming an array assembly; and
dividing the array assembly to create a plurality of individual lens systems, each of the individual lens systems having one lenslet from each of the at least two lens arrays.

33. The method according to claim 32, wherein attaching the at least two lens arrays to the at least one spacer includes bonding the at least two lens arrays to the at least one spacer.

34. A method of making a lens system comprising the steps of:
providing a first lens array having at least one lens element and a second lens array having at least one lens element;
providing a spacer;
aligning the spacer with respect to the first lens array and the second lens array;
attaching the spacer to the first lens array and the second lens array, thereby forming an array assembly; and
dividing the array assembly into an individual lens system having one of the at least one lens elements of the first lens array and one of the at least one lens elements of the second lens array.

35. The method according to claim 34, wherein attaching the spacer to the first lens array and the second lens array includes bonding the spacer to the first lens array and the second lens array.

36. The method according to claim 34, wherein aligning the spacer with respect to the first lens array and the second lens array includes positioning the spacer between the first lens array and the second lens array such that a lenslet of the first lens array overlays a lenslet of the second lens array and a hole of the spacer is located between the lenslet of the first lens array and the lenslet of the second lens array.

37. The method according to claim 34, wherein dividing the array assembly includes singulating the array assembly.

38. An individual optical assembly comprising:
a first lens lenslet;
a second lens element; and
a spacer positioned between the first element and the second lens element, wherein the first element, the second lens element, and the spacer are divided from an array assembly including a first lens array having at least one lens element and a second lens array having at least one lens element, and a spacer attached to the first lens array and the second lens array.

* * * * *